United States Patent
Tokunaga et al.

(10) Patent No.: US 8,240,164 B2
(45) Date of Patent: Aug. 14, 2012

(54) AIR CONDITIONING APPARATUS HAVING A BLOWER DOWNSTREAM OF THE HEAT EXCHANGERS

(75) Inventors: Takahiro Tokunaga, Kosai (JP); Hitomi Asano, Kariya (JP)

(73) Assignee: Denso Corporation, Kariya (JP)

(*) Notice: Subject to any disclaimer, the term of this patent is extended or adjusted under 35 U.S.C. 154(b) by 758 days.

(21) Appl. No.: 12/220,176

(22) Filed: Jul. 22, 2008

(65) Prior Publication Data
US 2009/0025905 A1 Jan. 29, 2009

(30) Foreign Application Priority Data
Jul. 23, 2007 (JP) ................. 2007-190894

(51) Int. Cl.
*B60H 1/32* (2006.01)
*F25B 29/00* (2006.01)
(52) U.S. Cl. ............... 62/244; 62/239; 165/61
(58) Field of Classification Search .............. 62/239, 62/244; 165/201, 202, 297, 42, 48.1, 61, 165/164, 103, 122; 454/139, 159, 160, 161
See application file for complete search history.

(56) References Cited

U.S. PATENT DOCUMENTS

| | | | |
|---|---|---|---|
| 5,676,204 A | 10/1997 | Samukawa et al. | |
| 5,950,711 A | 9/1999 | Bendell | |
| 6,351,961 B1 * | 3/2002 | Kurokawa et al. | 62/244 |
| 6,886,350 B2 * | 5/2005 | Petesch et al. | 62/97 |
| 6,923,012 B2 * | 8/2005 | Kurata et al. | 62/159 |
| 6,978,628 B2 * | 12/2005 | Honda | 62/134 |
| 2004/0074248 A1 * | 4/2004 | Tanaka et al. | 62/244 |
| 2004/0093885 A1 | 5/2004 | Ito et al. | |
| 2005/0126774 A1 * | 6/2005 | Yamaguchi et al. | 165/204 |
| 2006/0177322 A1 | 8/2006 | Lipa, III | |
| 2008/0115518 A1 | 5/2008 | Ozeki et al. | |

FOREIGN PATENT DOCUMENTS

| | | |
|---|---|---|
| JP | 61-115709 | 6/1986 |
| JP | 07-186692 A | 7/1995 |
| JP | 9-132024 | 5/1997 |
| JP | 2001-26209 | 1/2001 |

(Continued)

OTHER PUBLICATIONS

Office action dated Apr. 28, 2009 in Japanese Application No. 2007-190894.

(Continued)

*Primary Examiner* — Frantz Jules
*Assistant Examiner* — Daniel C Comings
(74) *Attorney, Agent, or Firm* — Harness, Dickey & Pierce, PLC

(57) ABSTRACT

An air conditioning system includes an air-conditioner casing, an air blower, a cooling heat exchanger, a heating heat exchanger, and a bypass passage. An electric motor of the blower has a rotating shaft that extends along a rotating shaft axis. An impeller of the blower suctions air from one side of the impeller along the rotating shaft axis to blow air in a radial direction of the impeller. The bypass passage causes cold air to bypass the heating heat exchanger. The air blower is located downstream of the cooling heat exchanger and the heating heat exchanger in a flow direction of air. The cooling heat exchanger and the heating heat exchanger are arranged in parallel with each other. The air blower is positioned on an imaginary extension of the heating heat exchanger. The rotating shaft is disposed in parallel with the heating heat exchanger.

16 Claims, 7 Drawing Sheets

FOREIGN PATENT DOCUMENTS

| | | |
|---|---|---|
| JP | 2003-136936 | 5/2003 |
| JP | 2004-161061 | 6/2004 |
| WO | WO 2007/015413 | 2/2007 |

OTHER PUBLICATIONS

U.S. Appl. No. 12/220,175, filed Jul. 22, 2008, Tokunaga.

Office Action dated Sep. 27, 2011 from the US Patent Office in the related patent U.S. Appl. No. 12/220,175.

Office action dated Dec. 6, 2011 in corresponding U.S. Appl. No. 12/220,175.

Office Action dated Jun. 9, 2011 from the US Patent Office in the related patent U.S. Appl. No. 12/220,175.

\* cited by examiner

AIR CONDITIONING APPARATUS HAVING A BLOWER DOWNSTREAM OF THE HEAT EXCHANGERS

CROSS REFERENCE TO RELATED APPLICATION

This application is based on and incorporates herein by reference Japanese Patent Application No. 2007-190894 filed on Jul. 23, 2007. This application is also related to U.S application Ser. No. 12/220,175 entitled "AIR CONDITIONING SYSTEM" filed Jul. 22, 2008.

BACKGROUND OF THE INVENTION

1. Field of the Invention

The present invention relates to an air conditioning system that adjusts temperature of air by using a cooling heat exchanger and a heating heat exchanger.

2. Description of Related Art

Conventionally, the above air conditioning system includes an air blower that is provided downstream of a cooling heat exchanger and a heating heat exchanger in a flow direction of air. Cold air blown by (or passing through) the cooling heat exchanger and hot air blown by (or passing through) the heating heat exchanger flow in parallel with each other toward an impeller of the air blower. Then, the cold air and the hot air are suctioned by the air blower, and the suctioned air is blown to a room (see, for example, JP-A-61-115709).

In the above air conditioning system, cold air blown by the cooling heat exchanger and hot air blown by the heating heat exchanger flow in parallel with each other toward the impeller of the air blower. As a result, the cold air and the hot air are not mixed before the cold air and the hot air are suctioned by the air blower. Thus, the cold air and the hot air are not effectively mixed, and thereby the air blown to the room has a biased distribution of temperature disadvantageously.

SUMMARY OF THE INVENTION

The present invention is made in view of the above disadvantages. Thus, it is an objective of the present invention to address at least one of the above disadvantages.

To achieve the objective of the present invention, there is provided an air conditioning system for conditioning air in a room, the air conditioning system including an air-conditioner casing, an air blower, a cooling heat exchanger, a heating heat exchanger, and a bypass passage. The air-conditioner casing causes air to flow into the room. The air blower is provided in the air-conditioner casing, and the air blower includes an electric motor and an impeller. The electric motor has a rotating shaft that extends along a rotating shaft axis. The impeller suctions air from one side of the impeller along the rotating shaft axis to blow air in a radial direction of the impeller to generate air flowing into the room by rotation of the rotating shaft of the electric motor. The cooling heat exchanger is provided in the air-conditioner casing for cooling air. The heating heat exchanger is provided in the air-conditioner casing for heating air, which has passed through the cooling heat exchanger. The bypass passage is provided in the air-conditioner casing for causing cold air, which has passed through the cooling heat exchanger, to bypass the heating heat exchanger. The air blower is located downstream of the cooling heat exchanger and the heating heat exchanger in a flow direction of air. Each of the cooling heat exchanger and the heating heat exchanger has a flat shape, and the cooling heat exchanger and the heating heat exchanger are arranged in parallel with each other. The air in the room is conditioned by using the cold air, which has passed through the bypass passage, and the hot air, which has passed through the heating heat exchanger. The air blower is positioned on an imaginary extension of the heating heat exchanger. The rotating shaft of the electric motor is disposed in parallel with the heating heat exchanger.

To achieve the objective of the present invention, there is provided an air conditioning system that includes an air-conditioner casing, an air blower, a cooling heat exchanger, a heating heat exchanger, and a bypass passage. The air blower is provided in the air-conditioner casing, wherein the air blower includes an electric motor and an impeller. The electric motor has a rotating shaft. The impeller suctions air from one side of the impeller along a rotational axis of the impeller, and the impeller blows air in a radial direction of the impeller to generate air flowing into a room. The rotational axis of the impeller extends along a width axis of the air-conditioner casing. The cooling heat exchanger is provided in the air-conditioner casing, and the cooling heat exchanger allows air to flow therethrough to cool air for generating cold air. The heating heat exchanger is provided downstream of the cooling heat exchanger within the air-conditioner casing in a flow direction of air. The heating heat exchanger allows a first part of the cold air, which is generated by the cooling heat exchanger, to flow therethrough to heat the cold air for generating hot air. The bypass passage is provided downstream of the cooling heat exchanger within the air-conditioner casing in the flow direction of air for allowing a second part of the cold air to flow therethrough to bypass the heating heat exchanger. The air blower is located downstream of the cooling heat exchanger and the heating heat exchanger in the flow direction of air. The cooling heat exchanger and the heating heat exchanger are arranged in parallel with each other. The air blower is positioned along a flat axis of the heating heat exchanger. The flat axis extends orthogonal to a direction of air flowing through the heating heat exchanger and orthogonal to the width axis of the air-conditioner casing. The hot air collides with the second part of the cold air at a position upstream of the one side of the impeller, and the hot air collides with the second part of the cold air by an angle ranging from 70° to 110°.

BRIEF DESCRIPTION OF THE DRAWINGS

The invention, together with additional objectives, features and advantages thereof, will be best understood from the following description, the appended claims and the accompanying drawings in which:

DETAILED DESCRIPTION OF PREFERRED EMBODIMENTS

First Embodiment

Figure 1:
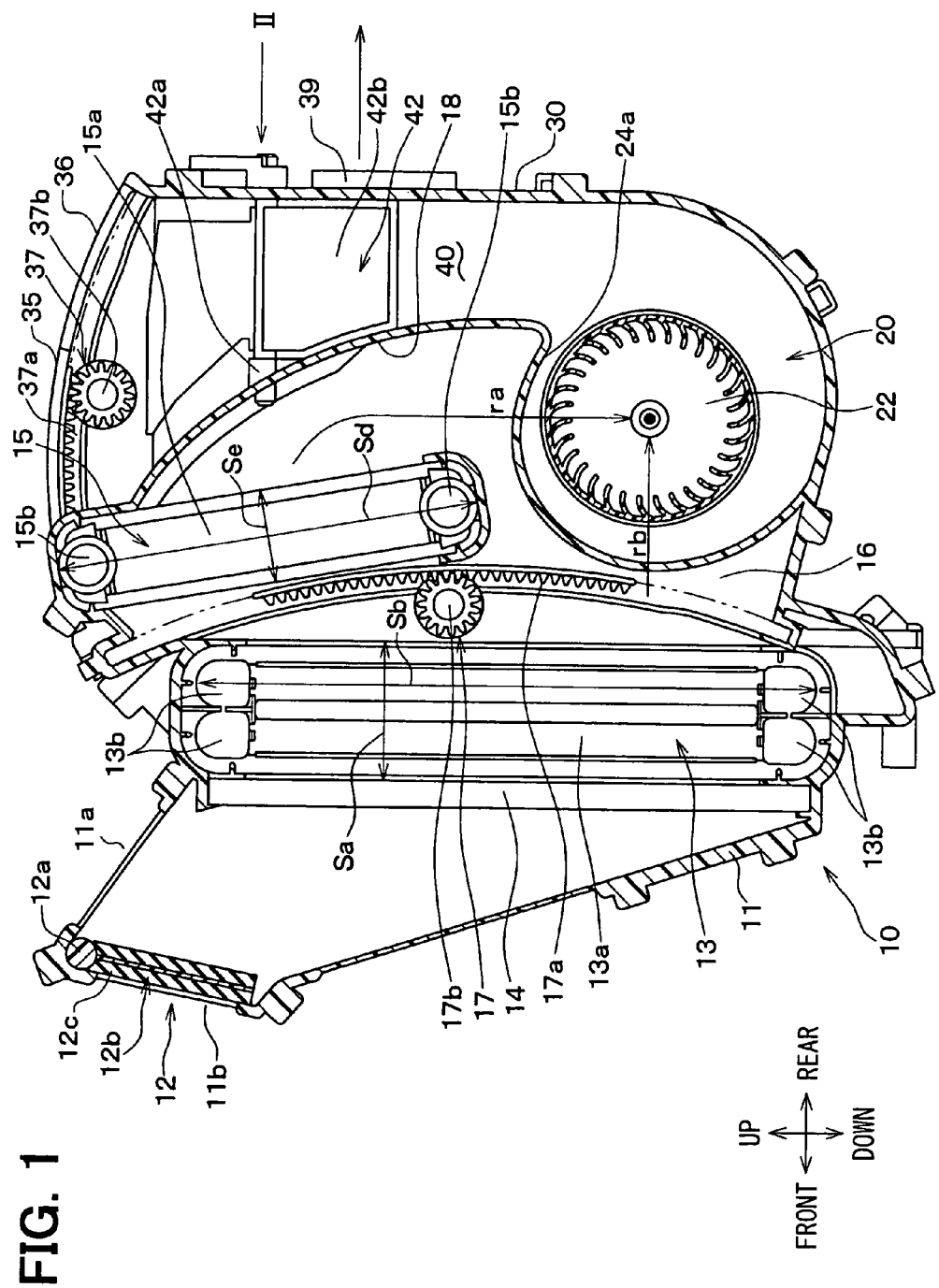
FIG. 1 is a cross-sectional view of a room unit assembly of a vehicular air conditioning system according to a first embodiment of the present invention viewed in a vehicle left-right direction.
Figure 2:
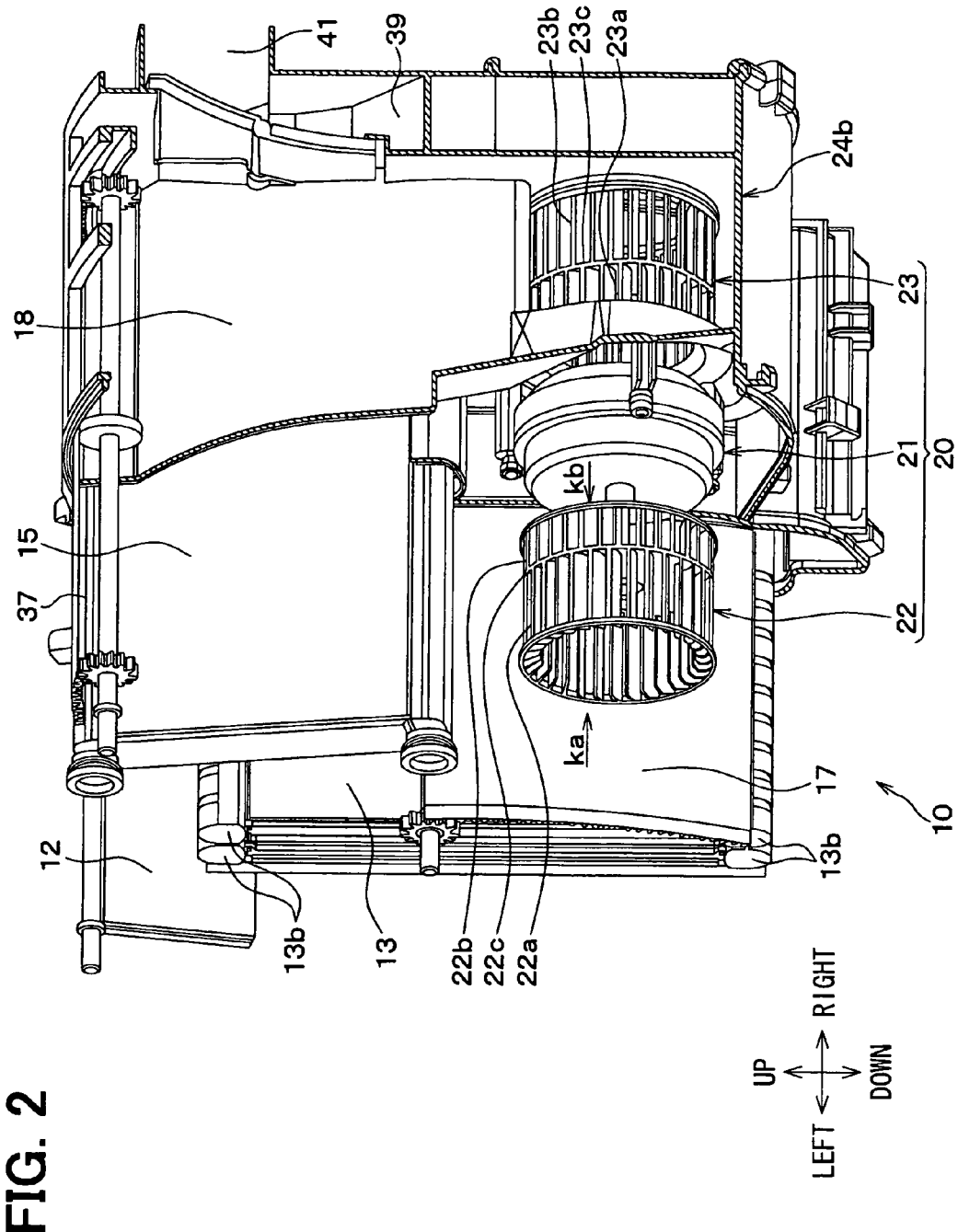
FIG. 2 is a perspective view showing an inside of the room unit assembly viewed in a direction indicated by an arrow II in FIG. 1.

A vehicle air conditioning system according to a first embodiment of the present invention will be described with reference to FIGS. 1 and 2. FIG. 1 is a cross-sectional view of a room unit assembly 10 of the vehicular air conditioning system viewed in a vehicle left-right direction. FIG. 2 is a perspective view showing an inside of the room unit assembly 10 viewed in a direction indicated by an arrow II in FIG. 1 A group of arrows indicating an upward direction, a downward direction, a frontward direction, and a rearward direction in FIG. 1 corresponds to directions when the vehicle air conditioning system is mounted in a vehicle. Also, another group of arrows indicating an upward direction, a downward direction, a left direction, and a right direction in FIG. 2 corresponds to directions when the vehicle air conditioning system is mounted in the vehicle.

The room unit assembly 10 is provided within an instrument panel around a center section in a vehicle left-right direction (in other words, in a width direction of the vehicle). The above instrument panel is located at a front part of a room (or a passenger compartment).

The room unit assembly 10 includes an air-conditioner casing 11, which serves as an outer shell of the room unit assembly 10, and which serves as an air passage for air blown to the room. The air-conditioner casing 11 has a certain elasticity and is made of a resin having a substantial strength. The above resin may be a polypropylene, for example.

Further, the air-conditioner casing 11 includes a divisional surface around a center section in the vehicle left-right direction (or around a center section of the air-conditioner casing 11 along a width axis of the air-conditioner casing 11), and the divisional surface extends in an up-down direction of the vehicle. The divisional surface divides the air-conditioner casing 11 into two transverse divided sections. Both of the above transverse divided sections are integrally joined with each other by using a faster (e.g., a metal spring, a clip, a screw) in a state, where the transverse divided sections receive the components, such as an air filter 14, an evaporator 13, a heater core 15.

As shown in FIG. 1, the air-conditioner casing 11 defines therein an air passage on a vehicle front side and a vehicle upper side of the air-conditioner casing 11. There are formed an internal air inlet port 11a and an external air inlet port 11b at a most upstream part of the air passage. The internal air inlet port 11a introduces internal air (internal air inside the room or inside the vehicle compartment) into the air-conditioner casing 11. The external air inlet port 11b introduces external air (external air outside the room or outside the vehicle compartment) into the air-conditioner casing 11.

Also, there is formed an internal-external air switching member 12 that is rotatably disposed inside the air passage for opening and closing the internal air inlet port 11a and the external air inlet port 11b such that the internal air and the external air is selectively introduced. Specifically, the internal-external air switching member 12 is a cantilever door that has a door main body portion 12c and a rotating shaft 12a fixed integrally with one end of the door main body portion 12c. The door main body portion 12c has a plate shape, and the rotating shaft 12a extends in the vehicle left-right direction.

The internal-external air switching member 12 rotates the rotating shaft 12a by using a servo motor (not shown). Thus, the internal-external air switching member 12 rotationally moves the door main body portion 12c such that opening areas of the internal air inlet port 11a and the external air inlet port 11b are continuously changed. The evaporator 13 is disposed downstream of the internal-external air switching member 12 in a direction of air flow.

The evaporator 13 is one of the components that constitute a known vapor-compression refrigeration cycle (not shown), and the evaporator 13 serves as a cooling heat exchanger that evaporates low-pressure refrigerant in the refrigeration cycle to cause an endoergic reaction to cool the air blown to the room.

The evaporator 13 includes multiple tubes 13a, tanks 13b, and heat exchanger fins (not shown) and has a flat shape. The evaporator 13 is provided to extends in a vertical direction or in an up-down direction relative to the vehicle when the evaporator 13 is mounted on the vehicle. In other words, the evaporator 13 extends along a flat axis, and the flat axis corresponds to the vertical direction. In the present embodiment, the above flat axis is orthogonal to a thickness direction Sa of the evaporator 13 and is also orthogonal to the vehicle left-right direction. Thus, the flat axis of the evaporator 13 is indicated as a longitudinal axis Sb of the evaporator 13. That is, the flat axis of the evaporator 13 corresponds to the longitudinal axis Sb of a cross section of the evaporator 13, the cross section being taken along a plane perpendicular to the width axis of the air-conditioner casing 11.

The tanks 13b are provided on an upper side of the multiple tubes 13a and on a lower side of the multiple tubes 13a. The tanks 13b distribute refrigerant to the multiple tubes 13a and collect refrigerant from the multiple tubes 13a. The upper tank 13b and the lower tank 13b are supported by the air-conditioner casing 11. The multiple tubes 13a are disposed parallel with each other in the up-down direction, and each of the tubes 13a allows refrigerant to flow therethrough. The heat exchanger fin facilitates heat exchange between (a) air and (b) the refrigerant in the tubes 13a.

Inside the air-conditioner casing 11, the air filter 14 having a thin plate shape is disposed upstream of the evaporator 13 in the air flow direction. The air filter 14 removes dust from air that flows into the evaporator 13.

The heater core 15 is disposed downstream of the evaporator 13 in the air flow direction. In other words, the heater core 15 is provided on a vehicle rear side and a vehicle upper side of the evaporator 13. The heater core 15 receives high-temperature engine coolant, which circulates in a engine coolant circuit (not shown), and which flows into from the circuit. Thus, the heater core 15 serves as a heating heat exchanger, which exchanges heat between (a) the engine coolant and (b) the cold air cooled by the evaporator 13 to reheat the cold air.

The heater core 15 includes multiple tubes 15a, upper and lower tanks 15b, and heat exchanger fins (not shown) to have a flat shape. The heater core 15 is tilted by a predetermined angle (less than about 30°) relative to the evaporator 13 such that the heater core 15 is aligned with or is provided generally in parallel with the evaporator 13.

The upper tank 15b is provided slightly on the vehicle front side relative to the lower tank 15b and distributes the coolant to the multiple tubes 15a. The lower tank 15b is provided slightly on the vehicle rear side relative to the upper tank 15b and collects the coolant from the multiple tubes 15a. The upper tank 15b and the lower tank 15b are supported by the air-conditioner casing 11. The multiple tubes 15a are arranged parallel with the evaporator 13.

Next, there is a bypass passage 16 provided on the vehicle rear side of the evaporator 13 and on a lower side of the heater core 15. The bypass passage 16 causes the cold air (cooled air), which has passed through the evaporator 13, to bypass the heater core 15. In other words, the bypass passage 16 allows the cold to pass therethrough to bypass the heater core 15, for example.

Further, as shown in FIG. 1, there is provided an air-mixing door 17 immediately after or immediately downstream of the evaporator 13. The air-mixing door 17 serves as a temperature adjustment door that adjusts a rate (ratio) of (a) an amount of cold air that flows toward the heater core 15 to (b) an amount of cold air that flows toward the bypass passage 16. In other words, the air-mixing door 17 adjusts a ratio of (a) an amount of a first part of cold air, which part flows toward the heater core 15, to (b) an amount of a second part of cold air, which part flows toward the bypass passage 16, for example. The air-mixing door 17 includes a plate member 17a and a gear mechanism 17b. The plate member 17a is curved to have an arcuate cross sectional shape and extends in the vehicle up-down direction. The air-mixing door 17 serves as a slide door, in which a servo motor (not shown) displaces the plate member 17a in a curved direction via the gear mechanism 17b.

More specifically, by displacing (or sliding) the plate member 17a of the air-mixing door 17 in the upward direction of the vehicle, an opening degree of a passage connected to the bypass passage 16 is increased, and an opening degree of an other passage connected to the heater core 15 is decreased. In contrast, by displacing (or sliding) the plate member 17a in the downward direction of the vehicle, the opening degree of the passage to the bypass passage 16 is decreased, and the opening degree of the other passage to the heater core 15 is increased.

By adjusting the opening degrees of passages of the air-mixing door 17, the air amount rate of the cold air and the hot air suctioned into an air blower 20 is adjusted. Thus, a temperature of the air blown by the air blower 20 to the room is able to be adjusted. In other words, the air-mixing door 17 constitutes temperature adjusting means for the air blown to the room.

The air blower 20 is provided on a lower side of the heater core 15 inside the air-conditioner casing 11 and is on an imaginary extension of the heater core 15. In the above description, a position on the imaginary extension of the heater core 15 means a position located on the lower side of the heater core 15 along a flat axis (an axis indicated by the arrow Sd in FIG. 1). In the above, the flat axis of the heater core 15 corresponds to a longitudinal axis Sd of a cross section of the heater core 15, which cross section is taken by a plane perpendicular to the width axis of the air-conditioner casing 11, for example.

Specifically, the air blower 20 includes an electric motor 21, impellers 22, 23, and scroll casings 24a, 24b as shown in FIG. 1 and FIG. 2. It should be noted that numeral 24a is shown in FIG. 1, and numeral 24b is shown in FIG. 2. The electric motor 21 is provided within the air-conditioner casing 11 around a center section in the vehicle left-right direction, and the electric motor 21 has a rotating shaft that extends in both directions along a left-right axis of the vehicle.

Each of the impellers 22, 23 is a centrifugal multiblade fan, and the impeller 22 is fixed to a left end portion of the rotating shaft of the electric motor 21. The impeller 22 includes a fan member 22a, a fan member 22b, and a partition wall 22c. The fan member 22a includes multiple blades arranged around the rotating shaft and suctions air from a left side of the fan member 22a along the rotating shaft or in a direction as indicated by an arrow ka in FIG. 2. Then, the fan member 22a blows air in the radial direction of the fan member 22a. Also, the fan member 22b includes multiple blades arranged around the rotating shaft and suctions air from a right side of the fan member 22b along the rotating shaft or in a direction as indicated by an arrow kb in FIG. 2. Then, the fan member 22b blows air in the radial direction of the fan member 22b (or of the rotating shaft). The partition wall 22c partitions the fan members 22a, 22b. As above, the impeller 22 is able to suction air from both ends of the impeller 22 along the rotating shaft and is able to blow air in the radial direction of the impeller 22 (or of the rotating shaft).

The impeller 23 is fixed to the right end portion of the rotating shaft of the electric motor 21 and the impeller 23 includes a fan member 23a, a fan member 23b, and a partition wall 23c similar to the impeller 22. The fan member 23a includes multiple blades arranged around the rotating shaft and suctions air from a left side of the fan member 23a along the rotating shaft. Then, the fan member 23a blows air in the radial direction of the fan member 23a. The fan member 23b includes multiple blades arranged around the rotating shaft and suctions air from a right side of the fan member 23b along the rotating shaft. Then, the fan member 23b blows air in the radial direction of the fan member 23b. The partition wall 23c partitions the fan members 23a, 23b. As above, the impeller 23 is able to suction air from both ends of the impeller 23 along the rotating shaft and is able to blow air in the radial direction of the impeller 23 (or of the rotating shaft).

The scroll casing 24a receives each of the fan members 22a, 22b of the impeller 22 and forms an outflow air passage, through which air flowing out of the fan members 22a, 22b flows. The scroll casing 24a defines an outflow air passage having a convoluted shape, and the outflow air passage has a cross sectional area that is gradually increased as a function of a position in a rotation direction of the impeller 22. The scroll casing 24a includes two suction ports and an outlet port. The two suction ports are provided on both ends of the scroll casing 24a along the rotating shaft, and the outlet port allows the air, which is blown by the impeller 22, to flow upward.

The scroll casing 24b receives each of the fan members 23a, 23b of the impeller 23 and forms an outflow air passage, through which air flowing out of the fan members 23a, 23b flows. The scroll casing 24b defines an outflow air passage having a convoluted shape, and the outflow air passage has a cross sectional area that is increased as a function of a position in a rotation direction of the impeller 23. The scroll casing 24b includes two suction ports and an outlet port. The two suction ports are provided on both ends of the scroll casing 24b along the rotating shaft, and the outlet port allows the air, which is blown by the impeller 23, to flow upward.

There is provided a partition wall 18 within the air-conditioner casing 11 on a vehicle rear side of the heater core 15 and the partition wall 18 serves as a guide wall that guides hot air (heated air), which flows from or has passed through the heater core 15, toward the air blower 20 as shown in FIG. 1.

There is provided an air passage 40 (see FIG. 1) inside the air-conditioner casing 11 between the partition wall 18 and a rear wall 30 for guiding the air blown by the scroll casings 24a, 24b toward outlet ports 35, 36. The outlet port 36 is provided on a vehicle rear side portion of an upper surface portion of the air-conditioner casing 11, and the outlet port 36 is a face opening portion, which causes air flowing in the air passage 40 to flow toward an upper body of an occupant.

The outlet port 35 is located on the upper surface portion of the air-conditioner casing 11 at a position on a vehicle front side of the outlet port 36. The outlet port 35 serves as a defroster opening portion, which causes air flowing in the air passage 40 to flow toward an inner face of the windshield of the vehicle. The blow mode door 37 is provided within the air-conditioner casing 11 on an inward side of the outlet ports 35, 36, and the blow mode door 37 includes a plate member 37a and a gear mechanism 37b. The plate member 37a is curved to have an arcuate cross sectional shape and extends in a vehicle fore-and-aft direction. The blow mode door 37 serves as a slide door, in which a servo motor (not shown) displaces the plate member 37a in a curved direction via the gear mechanism 37b.

More specifically, by displacing or sliding the plate member 37a of the blow mode door 37 toward the front side of the vehicle, an opening degree of a passage connected to the outlet port 36 is increased, and an opening degree of an other passage connected to the outlet port 35 is decreased. In contrast, by displacing or sliding the plate member 37a toward the vehicle rear side, the opening degree of the passage to the outlet port 35 is increased, and the opening degree of the other passage to the outlet port 36 is decreased.

There is provided a rear seat foot opening portion 39 to the rear wall 30 of the air-conditioner casing 11 as shown in FIG. 1, and the rear seat foot opening portion 39 causes air flowing the air passage 40 to flow toward feet of an occupant in a rear seat. The air-conditioner casing 11 includes a front seat foot opening portion 41 as shown in FIG. 2, and the front seat foot opening portion 41 causes air flowing in the air passage 40 to flow toward feet of an occupant in a front seat.

In the air-conditioner casing 11, there is provided a foot door 42 on an inner side of the foot opening portions 39, 41. The foot door 42 is a butterfly door that includes a rotating shaft 42a and a door main body portion 42b. The rotating shaft 42a is integral with the door main body portion 42b and is fixed to a generally center section of the door main body portion 42b. The rotating shaft 42a extends in the vehicle fore-and-aft direction. The door main body portion 42b has a plate shape. The rotating shaft 42a is rotated by a servo motor (not shown) for rotationally displacing the door main body portion 42b such that the foot opening portions 39, 41 are opened and closed.

Next, an operation of the room unit assembly 10 of the present embodiment is described.

Firstly, the electric motor 21 of the air blower 20 rotates each of the impellers 22, 23. Then, the impeller 22 suctions air through both of the suction ports of the scroll casing 24a and blows air through the outlet port of the scroll casing 24a. The impeller 23 suctions air through both of the suction ports of the scroll casing 24b and blows air through the outlet port of the scroll casing 24b. By the operation of the air blower 20, air is introduced into the air-conditioner casing 11 through at least one inlet port of the internal air inlet port 11a and the external air inlet port 11b.

The air, which is introduced through the above at least one inlet port, passes through the air filter 14 to flow into the evaporator 13. The air goes through heat exchange with refrigerant such that the air is cooled to be cold air when the air passes through the evaporator 13.

Here, when the air-mixing door 17 opens each of the passage entry to the bypass passage 16 and the passage entry to the heater core 15, part of cold air, which flows from the evaporator 13, flows into the heater core 15 and is heated by the heater core 15. As a result, the part of cold air flows out of the heater core 15 as hot air. The hot air is guided by the partition wall 18 toward the air blower 20 and flows in a direction indicated by an arrow ra in FIG. 1. Rest of cold air, which flows from the evaporator 13, flows through the bypass passage 16 and flows in a direction indicated by an arrow rb in FIG. 1.

As a result, the cold air, which has passed through the bypass passage 16, and the hot air, which flows from the heater core 15, flow toward both suction ports of the scroll casing 24a. Before being suctioned through the above suction ports, the cold air and the hot air collide with each other by an angle of about 90°. Also, the cold air, which has passed through the bypass passage 16, and the hot air, which flows out of the heater core 15, flows toward both of the suction ports of the scroll casing 24b. Before being suctioned through the above suction ports, the cold air and the hot air collide with each other by an angle of about 90°.

As above, the cold air and the hot air, which collide with each other before being suctioned into the scroll casings 24a, 24b, are suctioned by the operation of the impellers 22, 23 and are blown in the radial direction of the impellers 22, 23. As a result, the cold air and the hot air of interest are mixed with each other and are blown in the radial direction as air for air conditioning.

The air for air conditioning passes through the scroll casings 24a, 24b and is blown to the air passage 40. The blown air for air conditioning passes through the air passage 40 and is blown into the room through one of the outlet ports 35, 36 and the foot opening portions 39, 41.

In the present embodiment as described above, the air blower 20 is provided on the lower side of the heater core 15 on an extension of the heater core 15. In other words, the air blower 20 is provided on a lower side of the heater core 15 along the flat axis Sd of the heater core 15. Thus, cold air, which has passed through the bypass passage 16, and hot air, which flows from the heater core 15, collide with each other by an angle of about 90° before the cold air and the hot air are suctioned into the suction ports of the scroll casing 24a (24b). In other words, the cold air, which has passed through the bypass passage 16, collides with the hot air, which has passed through the heating heat exchanger 15, by a degree of about 90° at a position upstream of suction ports of the scroll casing 24a (24b) of the impeller 22, 23 of the air blower 20 in the flow direction of air, for example.

Thus, the cold air and the hot air are suctioned into the air blower 20 after the cold air has collided with the hot air as above. As a result, the cold air is effectively mixed with the hot air by the impellers 22, 23 of the air blower 20, and thereby air for air conditioning, which is blown into the room through the outlet ports 35, 36 and the foot opening portions 39, 41, is limited from having a biased distribution of the temperature.

In the present embodiment, the air-mixing door 17 is provided downstream of the evaporator 13 in the air flow direction, and is provided upstream of the heater core 15 in the air flow direction. Thus, even when the air-mixing door 17 is slidably displaced for changing the ratio of (a) the amount of air flowing toward the bypass passage 16 to (b) the amount of air flowing toward the heater core 15, a collision angle is not changed provided that cold air flows toward both the bypass passage 16 and the heater core 15. In the above, the collision angle is an angle, by which cold air collides with hot air before the cold air and the hot air are suctioned into both of the suction ports of the scroll casing 24a (24b). As a result, regardless of the opening position of the air-mixing door 17 or the position of the plate member 17 of the air-mixing door 17, cold air and hot air are effectively mixed with each other by the air blower 20. In other words, even when the air-mixing door 17 is displaced, the cold air intersects with the hot air by a certain angle before the cold air and the hot air are suctioned into the air blower 20. As a result, regardless of the displacement of the air-mixing door 17, the cold air is caused to collided with the hot air before the cold air and the hot air are suctioned into the air blower 20.

In the present embodiment, the evaporator 13 and the heater core 15 are arranged generally in parallel with each other. Thus, the room unit assembly 10 is reduced in size.

In the present embodiment, the partition wall 18 guides hot air, which flows from the heater core 15, toward both of the suction ports of the scroll casing 24*a* (24*b*) of the air blower 20 within the air-conditioner casing 11. Thus, cold air is made more reliably collide with hot air.

In the present embodiment, the electric motor 21 is provided at the center section inside the air-conditioner casing 11 in the vehicle left-right direction. Also, the impeller 22 is provided on a left end (one end) of the rotating shaft of the electric motor 21, and the impeller 23 is provided on a right side (the other end) of the rotating shaft of the electric motor 21.

Thus, an air flow is limited from having biased wind velocity distribution in the vehicle left-right direction of the air-conditioner casing 11. Accordingly, the wind velocity distribution of air, which passes through the evaporator 13, is limited from being biased, and the wind velocity distribution of air, which passes through the heater core 15, is also limited from being biased. Thus, mixing of hot air with cold air is reliably performed.

Also, because each of the impellers 22, 23 suctions air from both ends thereof along the rotational axis of the impellers 22, 23, the wind velocity distribution of air flow in the vehicle left-right direction of the air-conditioner casing 11 is further limited from being biased. Thus, the wind velocity distribution of air, which passes through the evaporator 13, is further limited from being biased, and the wind velocity distribution of air, which passes through the heater core 15, is further limited from being biased. Therefore, mixing of hot air with cold air is further effectively and more reliably performed.

In the above first embodiment, cold air, which has passed through the bypass passage 16, and hot air, which flows from the heater core 15, collide with each other by an angle of about 90° before the cold air and the hot air are suctioned into the suction ports of the scroll casing 24*a* (24*b*). However, the embodiment is not limited to the above. For example, cold air, which has passed through the bypass passage 16, and hot air, which flows from the heater core 15, may alternatively collide with each other by an angle of about 70° to 110°.

Second Embodiment

Figure 3:
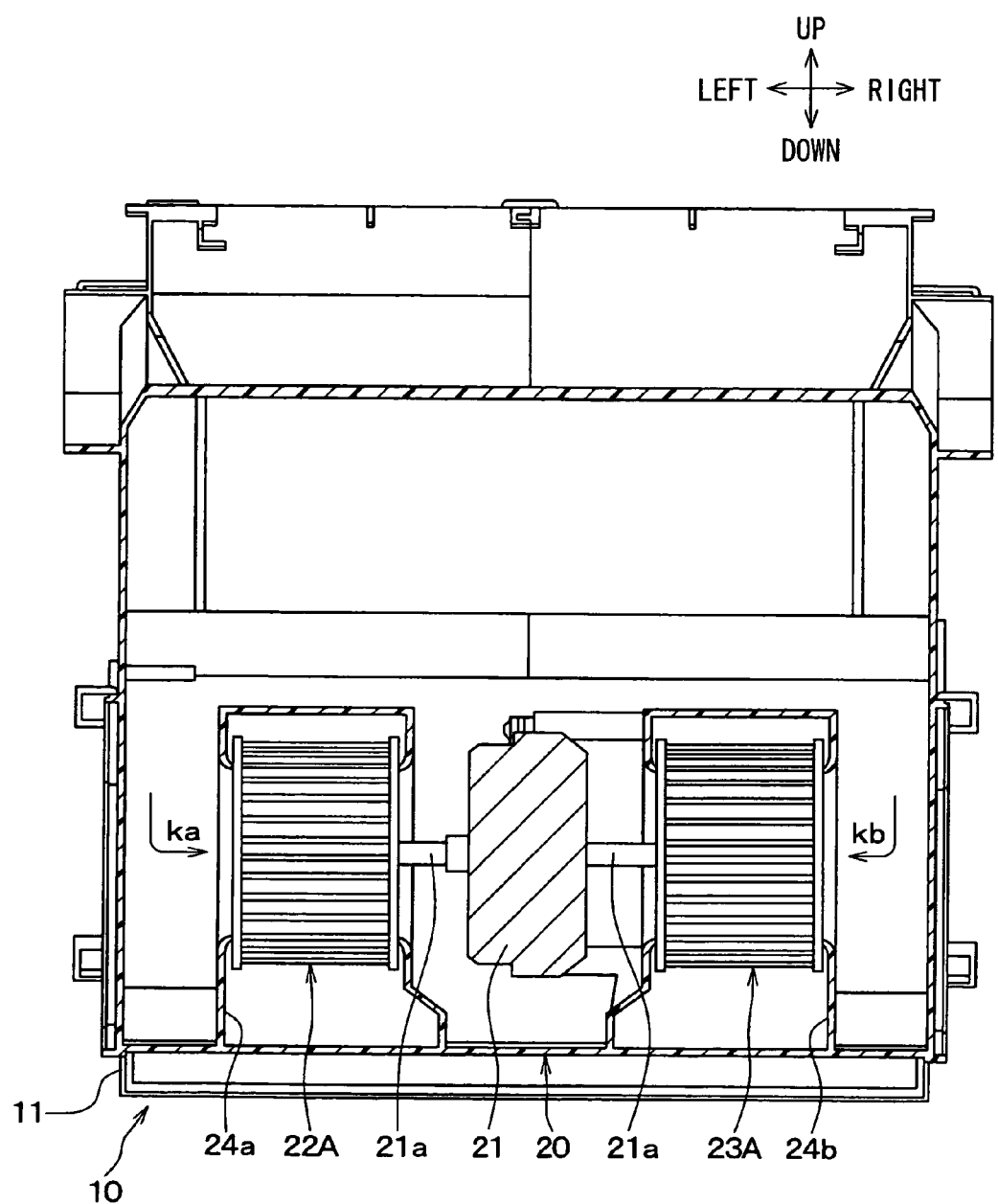
FIG. 3 is a cross-sectional view showing an inside of a room unit assembly according to a second embodiment of the present invention shown from a rear side of a vehicle.

In the above first embodiment, the impeller 22 (23) of the air blower 20 suctions air from both ends thereof along the rotational axis of the impeller 22 (23) or along the rotating shaft. In contrast, an impeller 22A (23A) of an air blower 20 of the second embodiment suctions air from only one end of the impeller along the rotational axis as shown in FIG. 3. Similar components of an air conditioning system in FIG. 3, which are similar to the components of the air conditioning system in FIGS. 1, 2, will be indicated by the same numerals.

Specifically, the impeller 22A suctions air from a left side of the impeller 22A along the rotational axis of the impeller 22A as indicated by an arrow ka, and blows air in the radial direction of the impeller 22A. The impeller 23A suctions air from a right side of the impeller 23A along the rotational axis as indicated by an arrow kb, and blows air in the radial direction of the impeller 23A. The impeller 22 is housed by the scroll casing 24*a*, and the impeller 23 is housed by the scroll casing 24*b*. A numeral 21*a* in FIG. 3 indicates the rotating shaft. It should be noted that in the present embodiment, a structure of the air blower 20 other than the impeller 22 (23) is similar to the structure shown in the above first embodiment, and thereby the explanation thereof is omitted.

Third Embodiment

Figure 4:
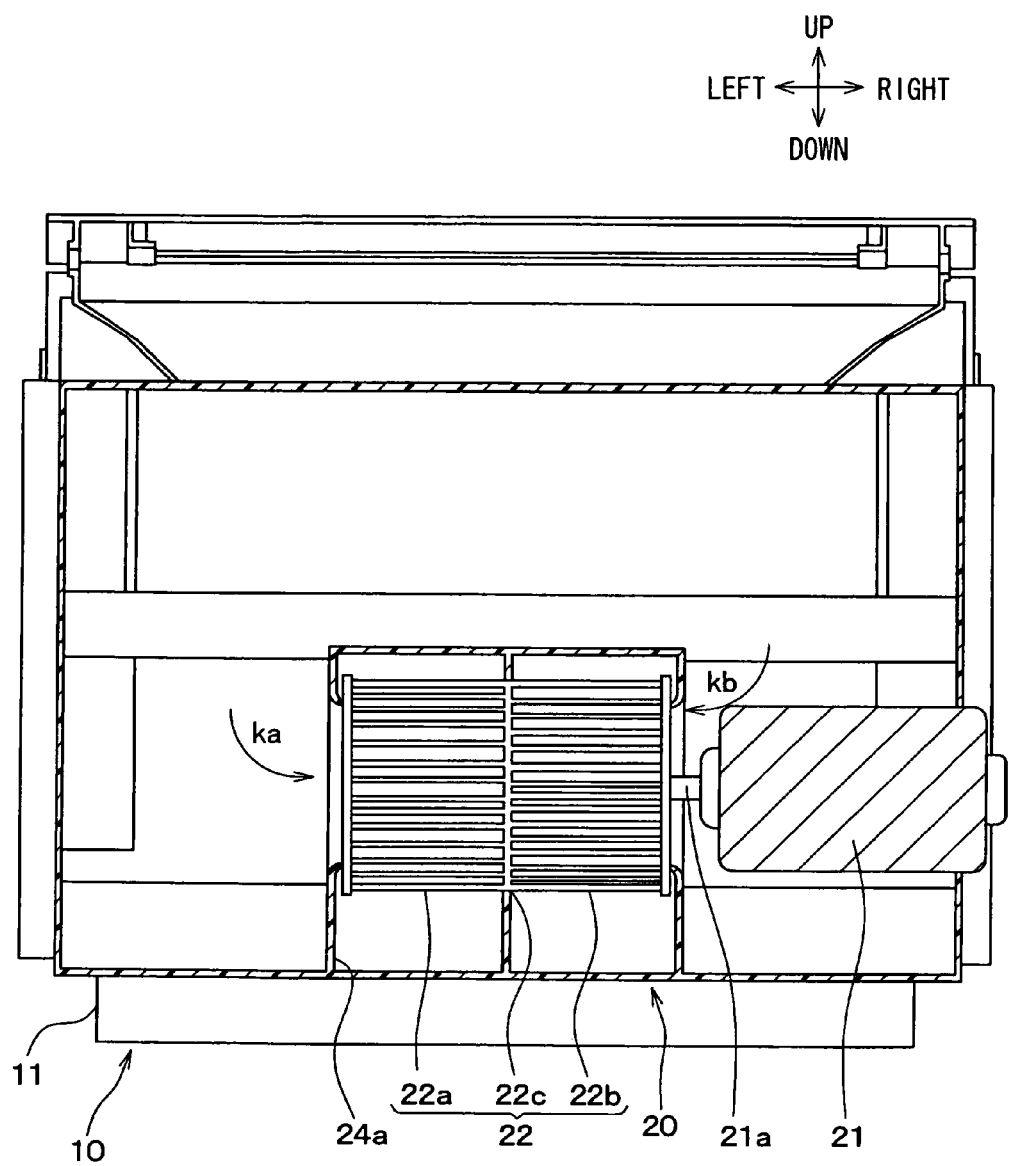
FIG. 4 is a cross-sectional view showing an inside of a room unit assembly according to a third embodiment of the present invention viewed from the rear side of the vehicle.

In the above first embodiment, the air blower 20 has two impellers 22, 23. In contrast, an air blower 20 of the third embodiment employs only one impeller 22 as shown in FIG. 4. Similar components of an air conditioning system in FIG. 4, which are similar to the components of the air conditioning system in FIGS. 1, 2, will be indicated by the same numerals, and thereby explanation thereof is omitted.

In the third embodiment, the rotating shaft 21*a* of the electric motor 21 projects toward a left side (one side) of the electric motor 21 in the vehicle left-right direction. The electric motor 21 is offset and provided on a right side (another side) in the vehicle left-right direction. Thus, the impeller 22 is solely provided at the center section in the vehicle left-right direction.

The impeller 22 is fixed to an end side of the rotating shaft 21*a* of the electric motor 21, and the impeller 22 includes a fan member 22*a*, a fan member 22*b*, and a partition wall 22*c*. The fan member 22*a* suctions air from a left side of the fan member 22*a* along the rotational axis, about which the fan member 22*a* rotates, as indicated by an arrow ka in FIG. 4, similar to the above first embodiment. Then, the fan member 22*a* blows air in the radial direction. The fan member 22*b* suctions air from a right side of the fan member 22*b* Along the rotational axis as indicated by an arrow kb in FIG. 4. Then, the fan member 22*b* blows air in the radial direction. The partition wall 22*c* partitions the fan members 22*a*, 22*b*. As a result, the impeller 22 suctions air from the both sides of the impeller 22 along the rotational axis and blows air in the radial direction of the impeller 22. It should be noted that in the present embodiment, because a structure of the air blower 20 other than the impeller 22 is similar to the structure in the above first embodiment, the detailed explanation thereof is omitted.

In the above third embodiment, the rotating shaft 21*a* of the electric motor 21 projects toward a left side of the vehicle, and the electric motor 21 is provided toward the right side in the vehicle left-right direction. In contrast, the rotating shaft 21*a* of the electric motor 21 may project toward the right side of the vehicle, and the electric motor 21 may be provided on the right side of the vehicle, alternatively.

Fourth Embodiment

Figure 5:
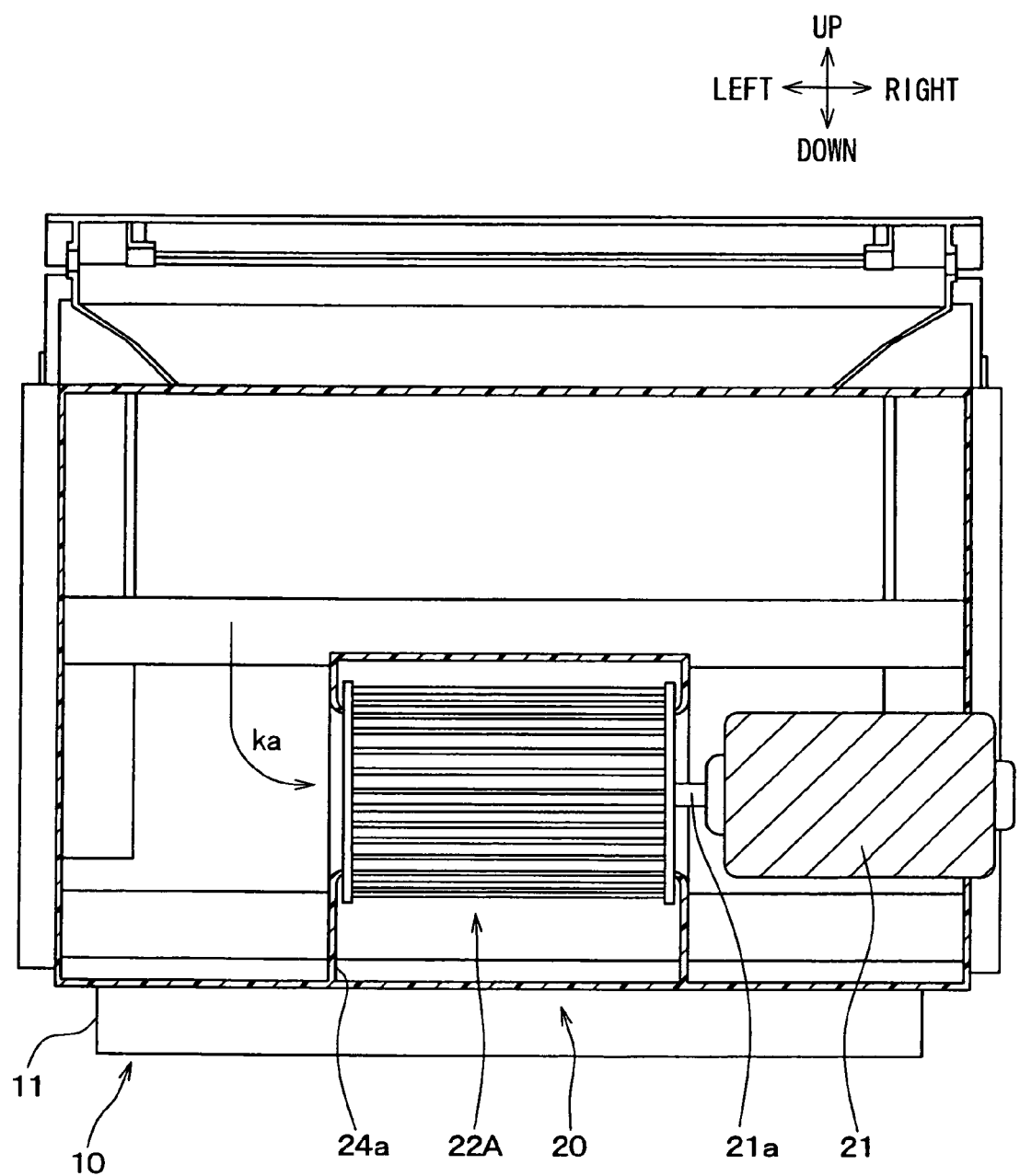
FIG. 5 is a cross-sectional view showing an inside of a room unit assembly according to a fourth embodiment of the present invention viewed from the rear side of the vehicle.

In the above third embodiment, the air blower 20 employs a centrifugal fan as the impeller 22, which suctions air from both sides of the impeller 22 along the rotational axis, and which blows air in the radial direction of the impeller 22. However, it is not limited to the above. In the fourth embodiment, as shown in FIG. 5, another centrifugal fan is used as the impeller 22A and the centrifugal fan suctions air from one side of the centrifugal fan along the rotational axis and blows air in the radial direction of the centrifugal fan. Similar components of an air conditioning system in FIG. 5, which are similar to the components of the air conditioning system in FIG. 4, will be indicated by the same numerals, and thereby explanation thereof is omitted. It should be noted that in the present embodiment, a structure of the air blower 20 other than the impeller 22 is similar to the structure in the first embodiment, and thereby the explanation thereof is omitted.

Fifth Embodiment

Figure 6:
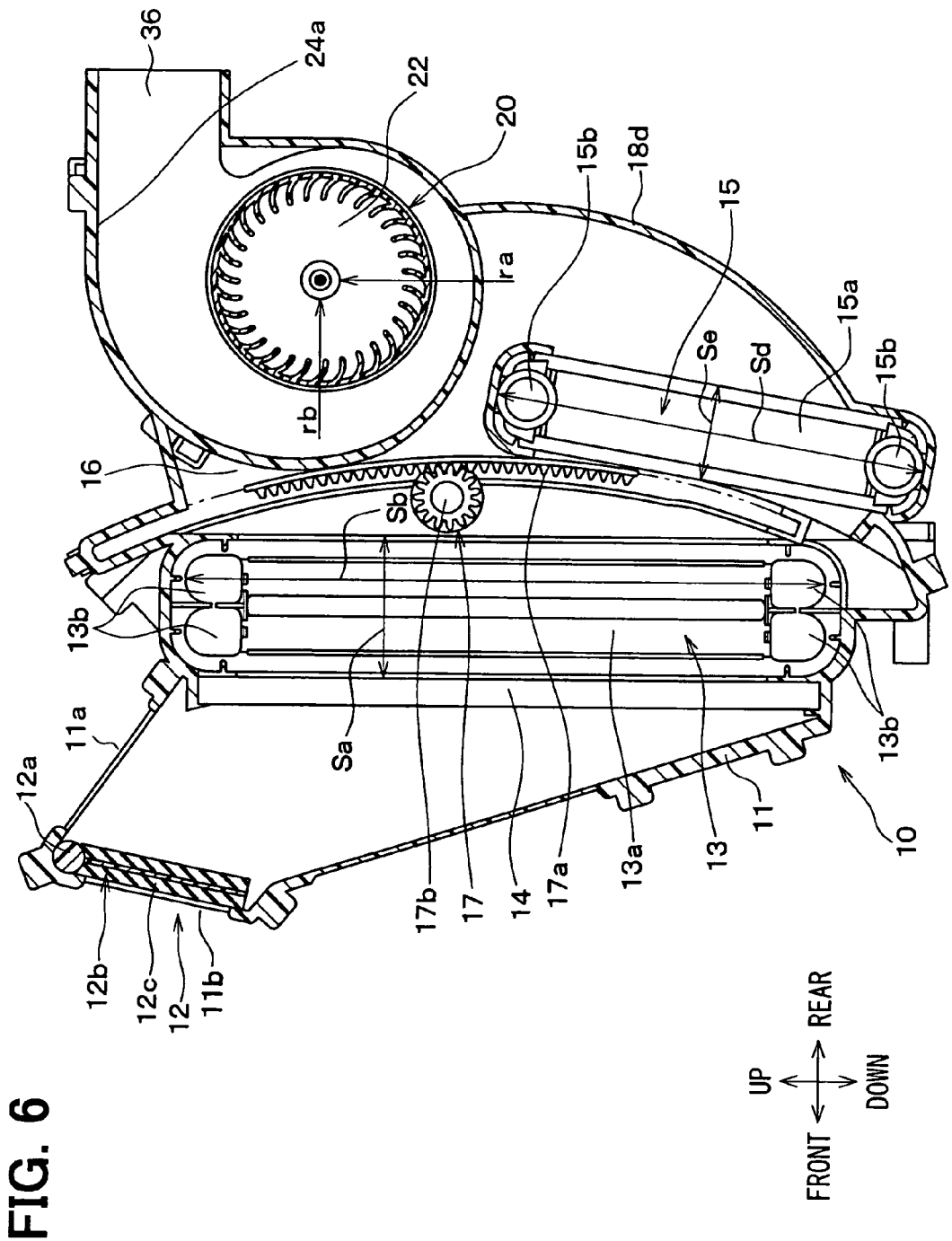
FIG. 6 is a cross-sectional view showing an inside of a room unit assembly according to a fifth embodiment of the present invention viewed in the vehicle left-right direction.

In the above fourth embodiment, the air blower 20 is provided on the lower side of the heater core 15 along the flat axis within the air-conditioner casing 11 and is on the extension of the heater core 15. In the fifth embodiment, as shown in FIG. 6, the air blower 20 is alternatively provided on an upper side of the heater core 15 and on the imaginary extension of the heater core 15. In other words the air blower 20 is provided on the upper side of the heater core 15 along the flat axis Sd.

In the fifth embodiment, the air-conditioner casing 11 includes a rear wall 18d, which is located on a vehicle rear side of the heater core 15. The rear wall 18d has a curved shape. The rear wall 18d serves as a guide wall that guides hot air, which passes through the heater core 15, toward both of the suction ports of the scroll casings 24a, 24b of the air blower 20. In FIG. 6, the scroll casing 24b is not shown.

Thus, hot air, which flows from the heater core 15, flows upwardly along the rear wall 18d. Then, the hot air flows in a direction indicated by an arrow ra and collides with cold air, which flows from the evaporator 13 in a direction indicated by an arrow rb, by an angle of about 90° before the hot air is suctioned into both of the suction ports of the scroll casing 24a (24b). Then, the collided cold air and collided hot air are suctioned into the impeller 22 (23) in operation and are blown in the radial direction of the impeller. Accordingly, the cold air and the hot air of interest are mixed with each other and are blown through outlet ports as air for air conditioning.

In the present embodiment, the outlet port 36 of the scroll casing 24a (24b) serves as the face opening portion, through which air is blown toward the upper body of the occupant.

Note that in the present embodiment, similar to the above first embodiment, the defroster opening portion, the blow mode door 37, the foot opening portion, and foot door are provided although the above components are not shown in the drawing. Similar components of the air conditioning system in FIG. 6, which are similar to the components of the air conditioning system in FIGS. 1, 2, will be indicated by the same numerals, and thereby explanation thereof is omitted.

Sixth Embodiment

Figure 7:
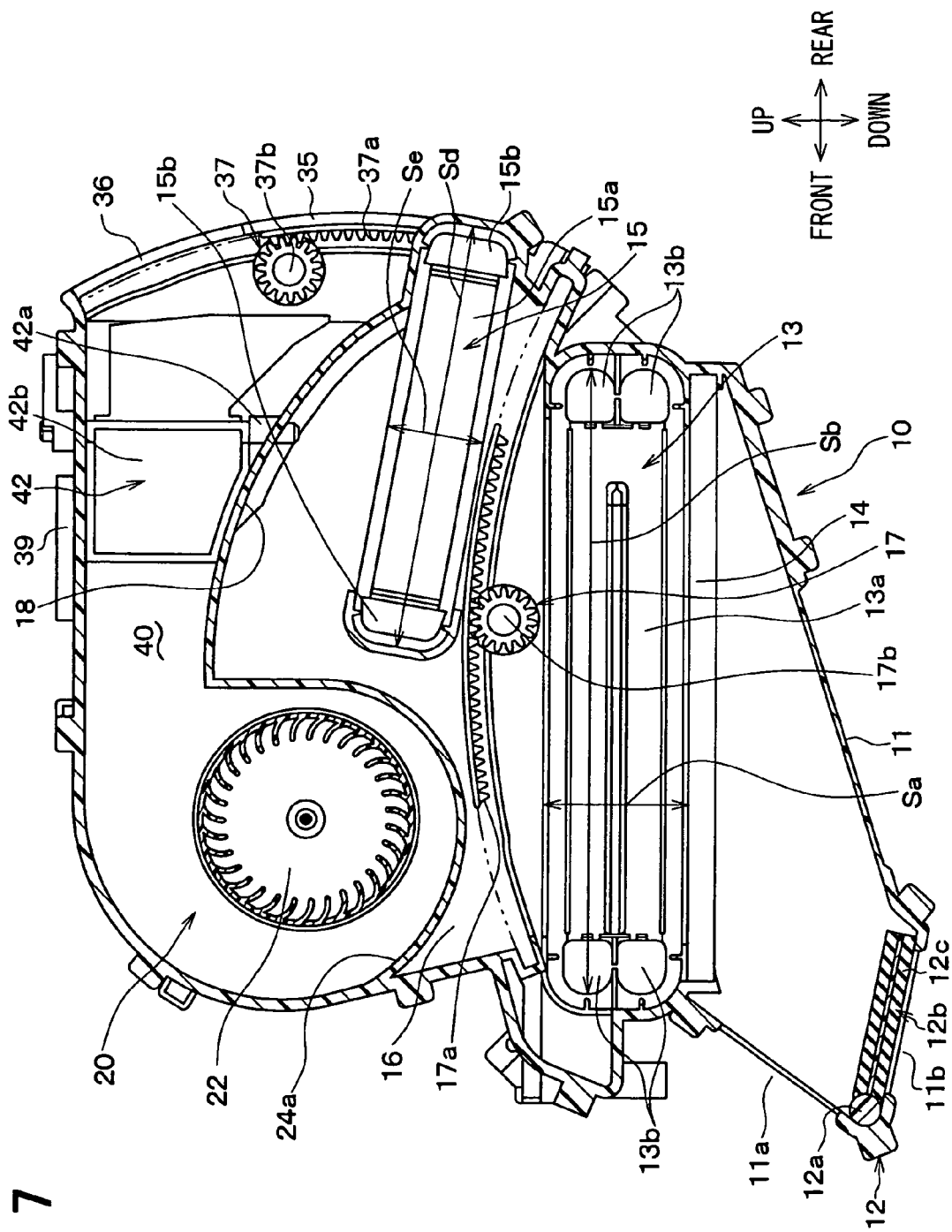
FIG. 7 is a cross-sectional view showing an inside of a room unit assembly according to a sixth embodiment of the present invention viewed in the vehicle left-right direction.

In the sixth embodiment, as shown in FIG. 7, the air blower 20 is provided on the upper side of the evaporator 13 in the vertical direction. Similar components of an air conditioning system in FIG. 7, which are similar to or substantially the same with the components of the air conditioning system in FIGS. 1, 2, will be indicated by the same numerals.

Compared with the room unit assembly 10 of the above first embodiment, arrangement of the air blower 20, the evaporator 13, the heater core 15, and the like in the sixth embodiment is different from the arrangement of the above components in the first embodiment. Thus, only the above different part is described below.

In the sixth embodiment, the evaporator 13 is provided in a horizontal direction. In other words, the flat axis of the evaporator 13 corresponds to the horizontal direction. The heater core 15 is tilted by a predetermined angle (less than about 30°) relative to the evaporator 13 or relative to the horizontal direction. Thus, the heater core 15 is arranged generally in parallel with the evaporator 13.

By displacing or sliding the plate member 17a of the air-mixing door 17 in the vehicle fore-aft direction, the opening degree of the passage to the bypass passage 16 and the opening degree of the passage to the heater core 15 are each increased and decreased.

Further, the internal air inlet port 11a, the external air inlet port 11b, and the internal-external air switching member 12 are provided on the vehicle front side of the air-conditioner casing 11 and are provided at lower side. The rear seat foot opening portion 39 opens at an upper side in the vertical direction, and the outlet ports 35, 36 open toward the vehicle rear side.

Other Embodiment

In the above first to fifth embodiments, the air conditioning system is applied to the vehicular air conditioning system. However, it is not limited to the above. The above air conditioning system may be applied to other air conditioning system, which is installed on site, other than the vehicular air conditioning system.

In the above first to fifth embodiments, the flat axis of the heater core 15 corresponds to the longitudinal axis Sd that is orthogonal to the thickness direction Se and is also orthogonal to the vehicle left-right direction. In other words, the flat axis is orthogonal to a flow direction of air flowing through the heater core 15 and orthogonal to the width axis of the air-conditioner casing 11, for example. However, the flat axis of the heater core 15 may be alternatively the vehicle left-right direction that is orthogonal to the thickness direction Se. In the above alternative case, the air blower 20 may be provided on a side of the heater core 15 in the vehicle left-right direction.

In the above first to fifth embodiments, the air-mixing door 17 employs a slide door. However, it is not limited to the above. The air-mixing door 17 may be a plate door, or a rotary door.

Additional advantages and modifications will readily occur to those skilled in the art. The invention in its broader terms is therefore not limited to the specific details, representative apparatus, and illustrative examples shown and described.

What is claimed is:
1. An air conditioning apparatus comprising:
an air-conditioner casing that causes air flow to flow into a vehicle, toward the vehicle windshield and a front seat;
an air blower that is provided in the air-conditioner casing, wherein the air blower includes:
an electric motor; and
an impeller that suctions air into an air inlet from a rotating shaft direction to blow the air in a radial direction through an air outlet in order to generate the air flow by rotation of a rotating shaft of the electric motor;
a cooling heat exchanger that is provided in the air-conditioner casing for cooling the air flow;
a heating heat exchanger that is provided in the air-conditioner casing for heating the air flow which has passed through the cooling heat exchanger; and
a bypass passage that is provided in the air-conditioner casing for causing cold air, which has passed through the cooling heat exchanger, to bypass the heating heat exchanger, wherein:
the air blower is located downstream of the cooling heat exchanger and the heating heat exchanger in a flow direction of air;
each of the cooling heat exchanger and the heating heat exchanger has a flat shape, the cooling heat exchanger and the heating heat exchanger being arranged in parallel with each other;

the air conditioning apparatus conditions air in the vehicle by using the cold air which has passed through the bypass passage and hot air which has passed through the heating heat exchanger;

the air blower is positioned on an extension of a flat direction that is orthogonal to a thickness direction of the flat shape of the heating heat exchanger;

the rotating shaft of the electric motor is disposed in parallel with an air outflow surface of the heating heat exchanger; and a partition wall is formed within the air-conditioner casing at a position downstream of the air outflow surface of the heating heat exchanger in the flow direction of air, the partition wall guiding the air flow which has passed through the heating heat exchanger toward the air blower; and an air passage inside the air-conditioner casing disposed directly between the partition wall and a rear wall of the casing guides, the air blown by the air blower toward a front seat foot opening portion defined by the air-conditioning casing and a defroster opening portion defined by the air-conditioning casing;

the air blown by the air blower flows through the air passage directly to the front seat foot opening portion defined by the air-conditioning casing toward feet of an occupant in a front seat of the vehicle and flows through the air passage directly to the defroster opening defined by the air-conditioning casing toward the windshield of the vehicle.

2. The air conditioning apparatus according to claim 1, further comprising:

a temperature adjustment door that is displaceably supported inside the air-conditioner casing, the temperature adjustment door being displaced to adjust a ratio of an amount of air which flows toward the bypass passage to an amount of air which flows toward the heating heat exchanger such that a temperature of air that is blown into the room is adjusted, wherein:

the temperature adjustment door is disposed downstream of the cooling heat exchanger and upstream of the heating heat exchanger in the flow direction of the air.

3. The air conditioning apparatus according to claim 1, wherein:

the cold air which has passed through the bypass passage collides with the hot air which has passed through the heating heat exchanger at a collision angle ranging from 70° to 110° before the cold air and the hot air are suctioned into the impeller of the air blower.

4. The air conditioning apparatus according to claim 1, wherein:

the heating heat exchanger has one end portion in the flat direction, the one end portion being positioned on an upper side in a vertical direction; and the heating heat exchanger has another end portion in the flat direction, the another end portion being positioned on a lower side in the vertical direction.

5. The air conditioning apparatus according to claim 4, wherein:

the air blower is positioned on an upper side relative to the heating heat exchanger in the vertical direction.

6. The air conditioning apparatus according to claim 4, wherein:

the air blower is positioned on a lower side relative to the heating heat exchanger in the vertical direction.

7. The air conditioning apparatus according to claim 1, wherein:

the cooling heat exchanger and the heating heat exchanger are arranged in parallel to a horizontal direction in a state where the heating heat exchanger is disposed on an upper side of the cooling heat exchanger;

the heating heat exchanger has one end portion in the flat direction, the one end portion being disposed on one side in the horizontal direction;

the heating heat exchanger has another end portion in the flat direction, the another end portion being disposed on another side in the horizontal direction;

the bypass passage is disposed adjacent the another end portion in the flat direction; and the air blower is disposed adjacent the another end portion in the flat direction and is disposed on an upper side of the cooling heat exchanger.

8. The air conditioning apparatus according to claim 1, wherein:

the cooling heat exchanger and the heating heat exchanger are arranged in parallel with a width direction of the air-conditioner casing;

the rotating shaft of the electric motor projects toward both sides in the width direction;

the impeller includes first and second impellers that are disposed at both end portions of the rotating shaft; and the electric motor is disposed around a center section of the air-conditioner casing in the width direction.

9. The air conditioning apparatus according to claim 8, wherein:

the first and second impellers suction air from only one side in the rotating shaft direction.

10. The air conditioning apparatus according to claim 8, wherein:

each of the first and second impellers suctions air from both sides in the rotating shaft direction.

11. The air conditioning apparatus according to claim 1, wherein:

the cooling heat exchanger and the heating heat exchanger are disposed in parallel with a width direction of the air-conditioner casing;

the rotating shaft of the electric motor projects toward only one side in the width direction;

the impeller is disposed adjacent an end of the rotating shaft; and the electric motor is offset and provided on another width side of the air-conditioner casing in the width direction.

12. The air conditioning apparatus according to claim 11, wherein:

the impeller suctions air from only one side in the rotating shaft direction.

13. The air conditioning apparatus according to claim 11, wherein:

the impeller suctions air from both sides in the rotating shaft direction.

14. The air conditioning apparatus according to claim 1, wherein the air passage extends continuously between the air outlet of the blower and the defroster opening defined by the casing.

15. The air conditioning apparatus according to claim 14, wherein the air passage extends continuously between the air outlet of the blower and the front seat foot opening portion defined by the casing.

16. The air conditioning apparatus according to claim 1, wherein the air passage extends continuously between the air outlet of the blower and the front seat foot opening portion defined by the casing.

* * * * *